UNITED STATES PATENT OFFICE.

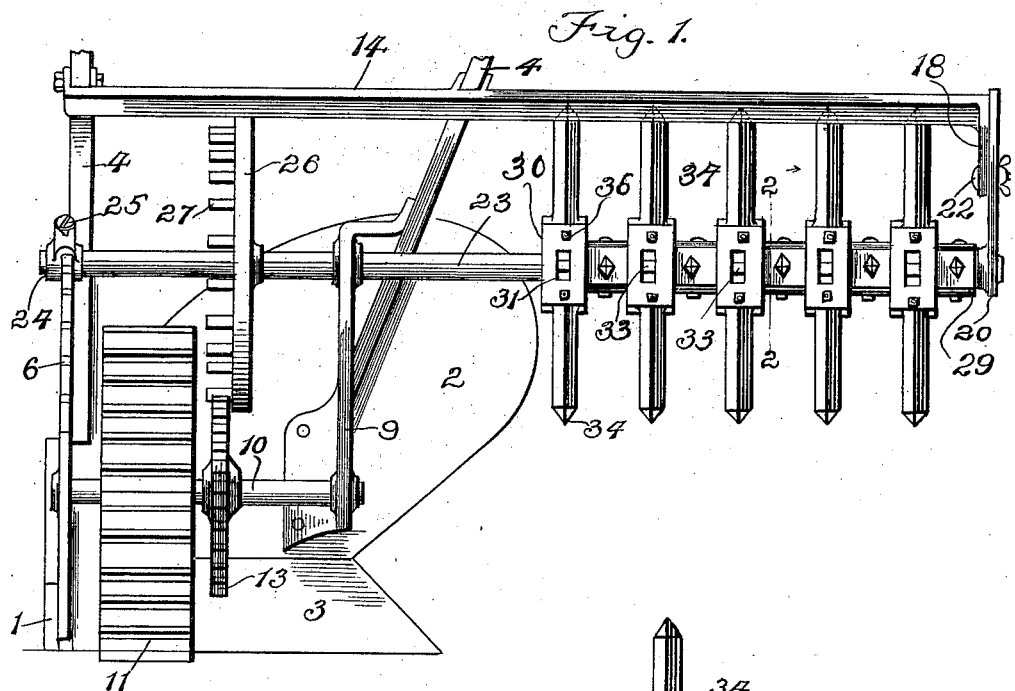

ALFRED L. GARLOUGH, OF ST. PAUL, MINNESOTA.

HARROW.

1,078,915. Specification of Letters Patent. Patented Nov. 18, 1913.

Application filed May 6, 1913. Serial No. 765,953.

*To all whom it may concern:*

Be it known that I, ALFRED L. GARLOUGH, citizen of the United States, residing at St. Paul, in the county of Ramsey and State of Minnesota, have invented certain new and useful Improvements in Harrows, of which the following is a specification.

This invention relates to harrow and cultivator teeth, and has for its object the provision of means whereby the teeth will be securely fastened to the beam or shaft by which they are carried but will yield to obstructions so that breaking of the teeth will be avoided.

The present improvements are designed more particularly for use upon harrows arranged as attachments for turning plows such as disclosed in Letters Patent granted to me June 3, 1913, No. 1,063,868.

The invention is illustrated in the accompanying drawings and consists in certain novel features which will be hereinafter first fully described and then more particularly pointed out in the appended claims.

In the drawings: Figure 1 is a rear elevation of a plow with a harrow attachment embodying my present invention connected therewith; Fig. 2 is a vertical section, taken on the line 2—2 of Fig. 1; Fig. 3 is a view similar to Fig. 2 showing a modification; Fig. 4 is a detail front elevation.

As illustrated in the accompanying drawings, the harrow attachment is shown applied to a breaking plow which includes a landside plate 1, mold-board 2, share 3 and handles 4 of the usual pattern and arrangement. A plate 6 is secured at its upper portion to one of the handles 4 and at its lower portion to the landside plate 1 and a similar plate 9 is secured to the mold-board 2 at its lower portion and to the other handle 4 at its upper portion. A shaft 10 is journaled at its ends in the plates 6 and 9 and a traction wheel 11 and gear wheel 13 are fixed to the said shaft 10 between said plates.

A bar 14 is secured to the handles 4 and projects beyond the handle which is located at the furrow slice side of the plow and at its extremity is angularly disposed, as at 18. A plate 20 is adjustably secured to said downturned extremity by a bolt 22. The outer end of a shaft 23 is journaled at the lower rear end of the plate 20 and the inner portion of the shaft 23 passes through the plates 6 and 9, the inner extremities of the shaft being journaled in a bearing 24 which is mounted upon the plate 6. A set-screw 25 passes through the side of the bearing 24 and is adapted to be engaged with any one of indentations provided in the upper edge of the said plate 6.

A wheel 26 is fixed to the shaft 23 at a point between the plates 6 and 9 and is provided at one side with a series of outstanding pins 27 which are adapted to engage between the teeth of the wheel 13 and may be equipped with rollers to reduce friction. Beyond the plate 9 the shaft 23 is approximately square in transverse section with rounded corner portions indicated at 29. The soil-engaging members or teeth are all mounted upon the non-circular outer portion of the shaft 23. Each soil-engaging member includes a pair of resilient plates 30, the plates being provided at points midway between their ends with longitudinally disposed slots 31 and being provided at their ends with inturned extremities 32. The members of each pair are positioned one at each side of the shaft 23, and angular pins 33 pass transversely through the shaft and are located at their end portions in the slots 31 of the plates. These pins 33 are designed to prevent the plates from moving longitudinally of the shaft, but will permit slight longitudinal movement of the said plates in order that they may flex or bend when they are subjected to strain during the operation of beating or breaking the soil. Teeth 34 are arranged in pairs the members of which are diametrically opposite each other with relation to the shaft 23 and radially disposed with relation to the said shaft. These teeth are provided at their inner end portions and at their opposite sides with transverse recesses which receive the inturned extremities 32 of the plates 30. Securing bolts 36 pass transversely through the plates 30 and the inner end portions of the teeth 34.

Throughout the series of soil-engaging members mounted upon the shaft 23 the teeth of one set of soil-engaging members are disposed at right angles to the teeth of the next adjacent set or sets and this relation is maintained throughout the entire series. The soil-engaging members are located beyond the outer or rear edge of the mold-board 2 of the plow and consequently they are positioned directly over the path into which the furrow slice is turned by the said mold-board.

As the plow to which the attachment is applied moves in a forward direction and turns a furrow slice, the wheel 11 travels along the bottom of a furrow and the shaft 10 rotates with the same which carries around the wheel 13. The wheel 26 is rotated in the opposite direction from that in which the wheel 11 rotates and the shaft 23 is consequently rotated so that its upper part moves rearwardly as the plow moves in a forward direction. The shaft 23 carries the teeth 34 around in the same direction and as the said teeth strike the furrow slice which is being turned by the mold-board 2, the material of the said slice is reduced so that the slice is effectually broken. As the teeth 34 strike the furrow slice the plates 30 to which they are attached may give so that the plow and the attachment are not subjected to undue strain due to the impact of the teeth against the furrow slice. At the same time should the teeth strike rock or other obstruction the said plates 30 will give sufficiently to permit the teeth to pass over the obstruction without injury.

By referring particularly to Figs. 1 and 4 it will be noted that the slot 31 in one plate 30 is of appreciable length while the slot in the co-acting plate is very slightly larger than the pin 33. This arrangement insures the retention of the plates in position upon the carrying rod or shaft while permitting them to yield readily to obstructions so that breakage will be avoided.

In Fig. 3, I have shown the invention applied to a cultivator tooth which is not intended to rotate, the upper ends of the plates being connected by a bow or arch 37 which may be formed integral with the plates.

What I claim is:—

1. A harrow attachment comprising a supporting member, resilient plates mounted thereon, and teeth secured between the plates and spaced from the supporting member.

2. A harrow attachment comprising a supporting member having a portion which is non-circular in transverse section, resilient plates mounted upon said portion of the shaft, and teeth carried between the ends of the plates and spaced from the supporting member.

3. A harrow attachment comprising a supporting member, pins passing through the same, resilient plates having elongated slots which receive the ends of said pins, and teeth carried between the plates and spaced from the supporting member.

4. A harrow attachment comprising a supporting member, resilient plates mounted upon the supporting member and having inturned ends, and teeth having in their sides recesses which receive the inturned ends of the plates.

5. A harrow attachment comprising a supporting member, pins passing through the supporting member, resilient plates having elongated slots which receive the end portions of the pins, said plates having inturned ends, teeth having in their sides recesses which receive the inturned ends of the plates, and bolts passing transversely through the plates and teeth.

6. A harrow attachment comprising a supporting member having a portion which is approximately square in transverse section and provided with rounded corners, pins passing transversely through the supporting member, resilient plates having slots which receive the pins, and teeth carried between the plates.

7. In an agricultural implement, the combination of a support, yieldable plates loosely held to opposite sides of said support, and a tooth held by and between the free ends of the plates.

In testimony whereof I affix my signature in presence of two witnesses.

ALFRED L. GARLOUGH. [L. S.]

Witnesses:
 FLORENCE VASSAR,
 JONAS S. STRONG.

Copies of this patent may be obtained for five cents each, by addressing the "Commissioner of Patents, Washington, D. C."